No. 780,676. PATENTED JAN. 24, 1905.
F. P. LIVINGSTON.
BRAKE RIGGING FOR SIX WHEELED TRUCKS.
APPLICATION FILED JUNE 1, 1903.
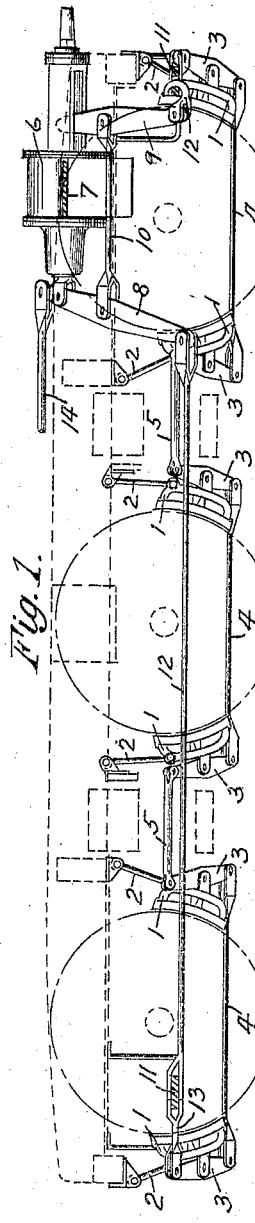
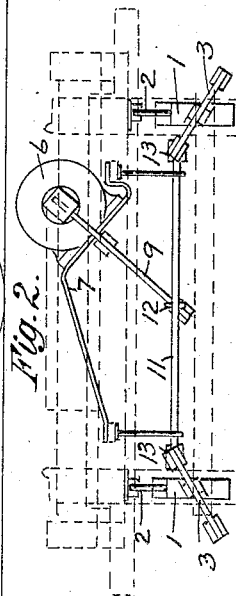
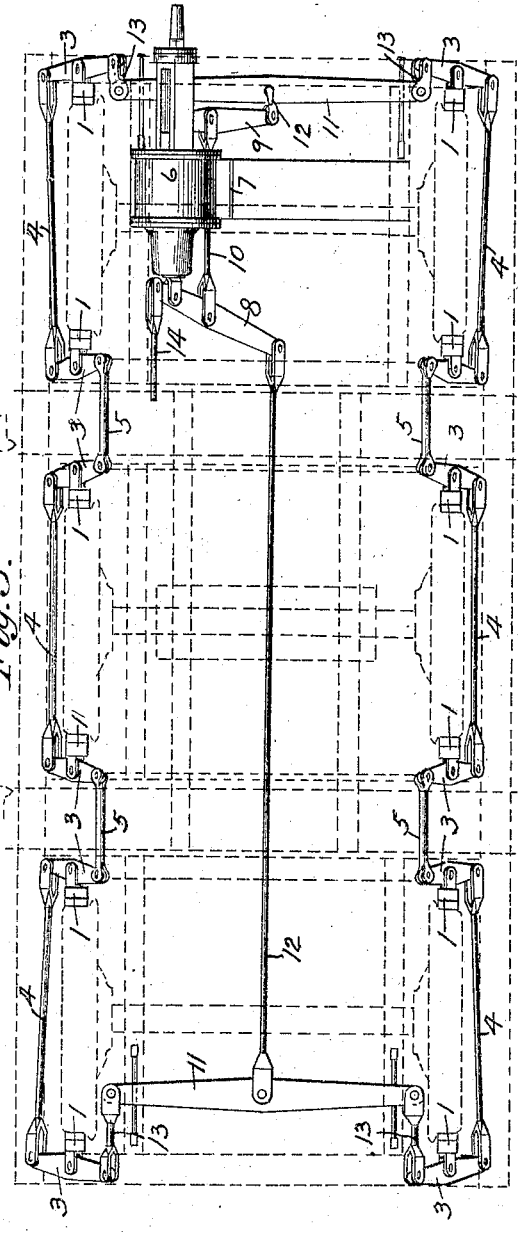
WITNESSES:
J. Custer
Jas. B. MacDonald
INVENTOR,
Fremont P. Livingston
By E. Wright
Att'y.

No. 780,676. Patented January 24, 1905.

UNITED STATES PATENT OFFICE.

FREMONT P. LIVINGSTON, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

BRAKE-RIGGING FOR SIX-WHEELED TRUCKS.

SPECIFICATION forming part of Letters Patent No. 780,676, dated January 24, 1905.

Application filed June 1, 1903. Serial No. 159,464.

*To all whom it may concern:*

Be it known that I, FREMONT P. LIVINGSTON, a citizen of the United States, residing in Pittsburg, in the county of Allegheny and State of Pennsylvania, have invented a certain new and useful Improvement in Brake-Rigging for Six-Wheeled Trucks, of which improvement the following is a specification.

This invention relates to brake-rigging for railway-cars, and has for its object to provide an equalized system of beamless brake-rigging particularly adapted for six-wheeled trucks in which brake-shoes are applied to both sides of each wheel.

In the accompanying drawings, Figure 1 shows a longitudinal section of my improved design of brake-rigging as applied to a six-wheeled truck, the wheels and members of the truck-frame being indicated in dotted lines; Fig. 2 an end view, and Fig. 3 a plan, of the same.

According to this construction brake heads and shoes 1, having the hangers 2, are applied to both sides of each truck-wheel, and pivoted upon the brake-heads in an inclined position are the brake-head levers 3, having the lower ends of the levers of each pair at each wheel joined by rods 4, located outside the wheels, while the upper ends of adjacent intermediate levers are connected by rods 5.

The brake-cylinder 6 is mounted on a bracket 7, secured to the truck-frame, and is provided with the cylinder-levers 8 and 9 and tie-rod 10. The cylinder-levers are connected to the upper ends of the front and rear brake-head levers by any suitable means, such as equalizing-bars 11 and connecting rods or links 12 and 13. A hand-operated brake-rod 14 is shown connected to the live-cylinder lever.

When the brakes are applied, the power will be transmitted from the cylinder-levers by means of the equalizing-bars and rod connections to the brake-head levers at the front and rear ends of the truck and will then equalize through the lower and upper rod connections between the brake-head levers, thus applying all the brake-shoes to the wheels with equal pressure and equalizing all the strains throughout the system, all members of the truck-frame being relieved from any such strains.

With my improved design of brake-gear having brake-shoes applied to both sides of each wheel the journal-bearings are relieved of any lateral pressure due to braking strains, and the tilting tendency produced by one shoe is counteracted by that of the other shoe, so that the system is perfectly balanced.

By the use of this improved design of brake-rigging having the small brake-head levers carried directly on the brake-heads a great saving in cost is effected, since the usual expensive brake-beams, with their connections, are entirely dispensed with. Another advantageous feature is that the space near the car-axle between the wheels usually occupied by the trussed brake-beam is open and unobstructed, so that dynamos for car-lighting or other purposes may be readily applied to the car-axle without interfering with the brake-rigging.

Having now described my invention, what I claim as new, and desire to secure by Letters Patent, is—

1. A brake-rigging for six-wheeled trucks, comprising brake-heads applied to both sides of each wheel, brake-head levers pivoted on the respective brake-heads, connections between said brake-head levers, power-levers for applying the brake and connections from the power-levers to the brake-head levers at opposite ends of the truck.

2. In a brake-rigging for six-wheeled trucks, the combination with brake-heads applied to both sides of each wheel and a lever pivoted on each brake-head, of rods connecting the lower and upper ends of said brake-head levers alternately and means for applying braking power to the brake-head levers at opposite ends of the truck.

3. In a brake-rigging for six-wheeled trucks, the combination with brake-heads applied to both sides of each wheel and levers pivoted in an inclined position on said brake-heads, of alternate upper and lower rod connections between said brake-head levers, and means for applying braking power to the brake-head levers at opposite ends of the truck.

4. In a brake-rigging for six-wheeled trucks, the combination with brake-heads applied to both sides of each wheel, a lever pivoted on each brake-head and connections between said brake-head levers, of a brake-cylinder lever mounted on the truck, and a cylinder-lever having connections for operating the brake-head levers.

5. In a brake-rigging for six-wheeled trucks, the combination with brake-heads applied to both sides of each wheel, a lever pivoted on each of said brake-heads and intermediate rod connections for said levers, of a brake-cylinder mounted on the truck, brake-cylinder levers therefor, and connections from said cylinder-levers to the brake-head levers at the respective opposite ends of the truck.

In testimony whereof I have hereunto set my hand.

FREMONT P. LIVINGSTON.

Witnesses:
R. F. EMERY,
JAS. B. MACDONALD.